No. 694,919. Patented Mar. 4, 1902.
D. H. HOUSTON.
ROLL HOLDING CAMERA.
(Application filed Dec. 23, 1896.)
(No Model.)
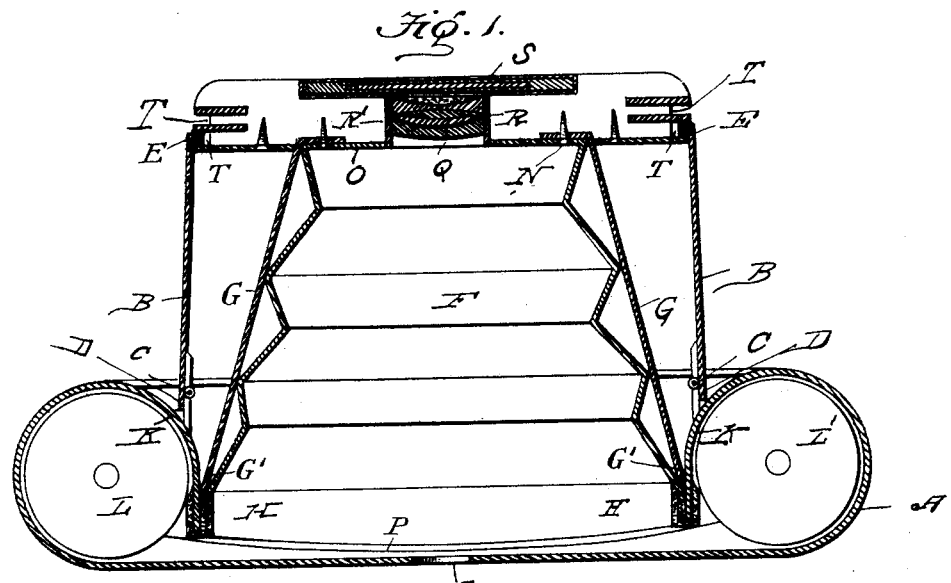
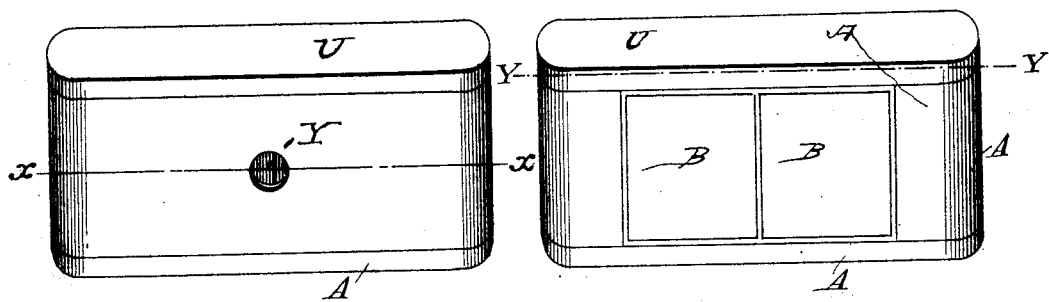
Witnesses:
David H. Houston, Inventor

UNITED STATES PATENT OFFICE.

DAVID H. HOUSTON, OF HUNTER, NORTH DAKOTA.

ROLL-HOLDING CAMERA.

SPECIFICATION forming part of Letters Patent No. 694,919, dated March 4, 1902.

Application filed December 23, 1896. Serial No. 616,712. (No model.)

*To all whom it may concern:*

Be it known that I, DAVID H. HOUSTON, a citizen of the United States, residing at Hunter, in the county of Cass and State of North Dakota, have invented certain new and useful Improvements in Roll-Holding Cameras; and I do hereby declare the following to be a full, clear, and exact description of the invention, such as will enable others skilled in the art to which it appertains to make and use the same.

My invention relates to folding roll-holding cameras; and my invention provides a novel camera for using the rolls of sensitized film which are on the market and generally known as "film-cartridges," and which rolls of film can be inserted into the camera in daylight and without the use of a non-actinic light.

An object of my invention is the production of a folding camera of a shape well adapted to carry in the pocket and being so constructed as to be of easy manufacture.

The principal object of my invention is to produce a camera having a novel casing made of sheet material, said sheet material being so bent as to form the back and ends and light-excluding divisions and the walls of the outer compartments for the spools of film and two of the walls of the central compartment.

A further object of my invention is the construction of a camera which is easily opened and closed and which will allow of the insertion of a supply-spool of film and a reel-spool, while the supply-spool and the reel-spool are connected together by the wrapper of the film-cartridge.

My invention consists of novel features of construction and combination of parts which are pointed out in the claims.

In this specification similar characters of reference denote corresponding parts in all of the drawings.

Figure 1 represents a central sectional plan view of my improved camera when unfolded, taken through the line X X of Fig. 2. Fig. 2 represents a diminished perspective view of my camera as it would appear from the rear when folded. Fig. 3 represents a diminished perspective view of my camera as it would appear from the front when folded. Fig. 4 represents a diminished view of the top of my camera on the line Y Y of Fig. 3 with the camera-cover removed and the camera folded. Fig. 5 represents a diminished view of the bottom of my camera when folded.

In the drawings the letter A designates the casing of the camera; B, folding doors which are hinged to the casing; C, the hinges of the said folding doors; D, the rear ends of said folding doors, which ends project rearward beyond the hinges; E, the angular ends of the folding doors; F, the camera-bellows; G, the elastic stays; G', the inner ends of the elastic stays, which are fastened between the inner end of the bellows F and the inner ends of the light-excluding divisions; H, the film-edge holder and rear frame of the bellows; I, the reel center and cross-head; J, the spool center and cross-head; K, the light-excluding divisions; L, the film-spool; L', the reel-spool; M, the top of the central compartment; N, the screw through the end of the front frame of the bellows and the elastic stay; O, the front frame of the bellows; P, the sensitized film; Q, the lens-opening; R, the lens; R', the lens-mount; S, the shutter; T, the focusing-notches; U, the light-tight cover of the camera-casing; V, the bottom of the camera; W, the passage-way across and through the central compartment; Y, the sight-opening in the rear of the camera.

The casing of my camera is of novel construction, the rear side, the ends, and the light-excluding divisions of the casing being made of one sheet of material bent to form the ends of the casing and turned inward at the front side of the casing to form light-excluding divisions. The central compartment is for exposing the sensitized film to the rays of light passed through the lens and also for holding the camera-bellows when it is folded, which bellows is connected at its rear end to the central compartment and to the top and bottom plates, which plates in combination with the light-excluding divisions and the rear side of the camera-casing combine to form the central compartment, which compartment is adapted to hold the camera-front and parts carried thereby, which camera-front is connected to and closes the front end of the bellows. Through the top of the central compartment there is a passage-way, and said passage-way leads across and through the top of the central compartment and between the open-ended outer compartments, and a light-tight cover fits over the said open-ended outer compartments and also over the passage-way in the top of the central compartment.

The camera-front and the parts carried thereby are supported upon the ends of the folding doors, which doors have angle ends fitting into notches in the ends of the front of the camera and by the spring of the doors caused by the peculiar hinges and together with the contractile stays act together to hold the camera-front in either of the focusing-notches desired.

At the rear side of the camera is a sight-opening Y, through which the indicia that indicate the position of the sensitized film can be observed, and the said sight-opening should be covered with a thin sheet of some transparent material, such as celluloid, slightly colored to exclude actinic rays of light.

From the foregoing description in connection with the drawings it may be readily understood that I provide a folding camera which is of easy construction and simple to operate and will produce satisfactory results and is of a shape to be easily put in a pocket.

To operate the camera, it is simply necessary to place a sensitized film in the camera in the following manner: Unroll the end of the wrapper-paper from a spool of sensitized film and connect the unrolled end of the wrapper-paper to a reel-spool. Then drop the supply-spool into the spool-compartment and the reel-spool into the reel-compartment and at the same time allow the connecting-wrapper of the film to pass through the passage-way in the top of the central compartment. Then place the light-tight cover over the open-ended spool and reel compartment and the passage-way through the top of the central compartment and turn the reel until the first indicia on the wrapper of the film comes opposite to the sight-aperture in the back of the camera. Then use the camera in the usual manner.

Having described my invention, I claim—

1. In a camera the combination of a casing having two open-ended outer compartments for holding the supply and the reel spools, a central compartment, a lens and shutter located in line with the central compartment, said central compartment located between the said lens and the focal plane of said lens, said casing provided with an inner top over the central compartment, said outer compartments connected by a passage-way across and through said inner top of the central compartment, and a light-tight cover over the open ends of the outer compartments and over the passage-way in the central compartment.

2. In a camera the combination of a casing having its rear side, ends and light-excluding divisions formed of one continuous sheet of bent material, two open-ended outer compartments having their side walls formed by the said sheet of bent material, a central compartment between the said two open-ended outer compartments, an inner top over the said central compartment, said inner top having a passage-way extending across and through the said inner top of the central compartment, a light-tight cover over the open ends of the spool and reel compartments and the passage-way in the central compartment, a bellows connected at its rear end to the central compartment, a front, a lens, and a shutter closing the front end of said bellows, means for supporting the bellows and front in a position where the lens can be focused upon a sensitized film when the said film is extended across the rear interior part of the central compartment, said front lens and bellows all being adapted to fold into the said central compartment.

3. In a camera the combination of a single plate of material forming the back of the camera-casing said plate being bent to form the sides of the open-ended spool and reel chambers and two sides of the central compartment of the camera, a plate forming the bottom of the camera, a plate forming the top of the central compartment, the top of the said central compartment having a slot across and through the said top, a cover over the said open-ended spool and reel compartments and over the slot across and through the top of the central compartment, a bellows connected at its rear end to the central compartment, said bellows having its forward end closed by a front and lens and shutter, and means for supporting and indicating the extent of projection of the lens.

4. In a camera the combination of a casing having a central compartment adapted to hold the bellows when collapsed, said casing provided with an inner top over the central compartment and with light-excluding divisions, two open-ended outer compartments, said outer compartments connected by a passage-way across and through said inner top of the central compartment, a light-tight cover over the open ends of the spool and reel compartments and the passage-way in the central compartment, a bellows having its forward end closed by a front and a lens and a shutter, said bellows connected at its rear end to the said light-excluding divisions and to the interior of the central compartment, and means for supporting the bellows and front in a position where the lens can be focused upon a sensitized film when the said film is extended across the rear interior part of the central compartment.

5. In a camera the combination with the casing of two open-ended outer compartments, and a central compartment, said casing having a passage-way leading across and through the top of the central compartment, said passage-way adapted to allow of the passage of the wrapper of the sensitized film when the said wrapper is connected from the supply-spool to the reel-spool, a light-tight cover over the open ends of the outer compartments and over the passage-way in the central compartment, bellows connecting the camera-front with the central compartment, and two folding doors in the front of the casing, said doors adapted to support the front of the camera in a position where the lens carried therein can be focused on the sensitized film in the central compartment of the camera.

6. In a camera the combination with the casing of two open-ended outer compartments, and a central compartment, said casing having a passage-way leading across and through the top of the central compartment, said passage-way adapted to allow the passage of the wrapper of the sensitized film when the said wrapper is connected from the supply-spool to the reel-spool, a light-tight cover over the open ends of the outer compartments and over the passage-way in the central compartment, a front connected by a bellows to the camera-casing, elastic stays connecting the front and casing of the camera, and two folding doors in the front of the casing, said doors adapted to support the front of the camera in a position where the lens carried therein can be focused on the sensitized film in the central compartment of the camera.

7. In a camera the combination of a casing having a central compartment adapted to hold the bellows when collapsed, and two open-ended outer compartments, said casing being provided with an inner top over the central compartment, said outer compartments being connected by a passage-way across and through said inner top of the central compartment, a light-tight cover over the open ends of the spool and reel compartments and the passage-way in the central compartment, a bellows having its forward end closed by a front and a lens and a shutter, said bellows connected at its rear end to the said central compartment, and means for supporting the bellows and front in a position where the lens can be focused upon a sensitized film when the said film is extended across the rear interior part of the said central compartment.

DAVID H. HOUSTON.

Witnesses:
WM. PARKHURST,
W. H. SIMMONS.